United States Patent [19]

Laesch

[11] Patent Number: 5,613,723
[45] Date of Patent: Mar. 25, 1997

[54] VEHICLE STORAGE COMPARTMENT WITH HOLD-OPEN DEVICE

[75] Inventor: Mark E. Laesch, Eastpointe, Mich.

[73] Assignee: Chrysler Corporation, Auburn Hills, Mich.

[21] Appl. No.: 331,406

[22] Filed: Oct. 31, 1994

[51] Int. Cl.⁶ .................................................. B60R 7/00
[52] U.S. Cl. .......................... 296/37.8; 296/37.12; 16/341
[58] Field of Search ................................ 296/37.8, 37.12; 16/341, 342, 321

[56] References Cited

U.S. PATENT DOCUMENTS

| | | | |
|---|---|---|---|
| 4,266,321 | 5/1981 | Pelchat et al. | 16/145 |
| 4,993,772 | 2/1991 | Charen | 296/97.1 |
| 4,997,228 | 3/1991 | Kempkers | 296/97.2 |
| 5,143,265 | 9/1992 | Schultz | 296/37.12 X |
| 5,413,317 | 5/1995 | Spoerie | 296/37.8 X |

Primary Examiner—Joseph D. Pape
Attorney, Agent, or Firm—Thomas G. Pasternak

[57] ABSTRACT

A vehicle storage compartment includes a door hingedly mounted thereon, with a hold-open device integrally molded on the door and in the storage compartment. The hold-open device includes a substantially one-fourth circle cam molded on an inner surface of the door, and a flex finger molded on an upper surface of the storage compartment. The flex finger serves to hold the door open until manually forced downwardly, thereby bending the flex finger while the cam moves therepast to allow the door to be closed.

8 Claims, 3 Drawing Sheets

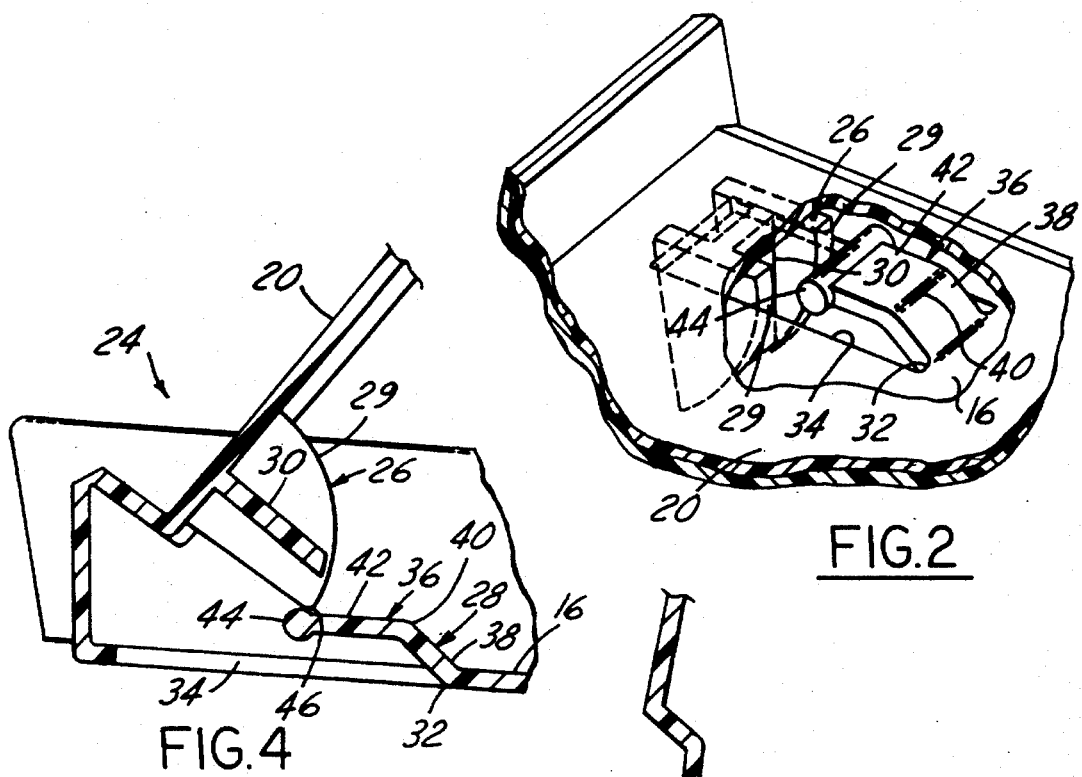
FIG.2
FIG.4
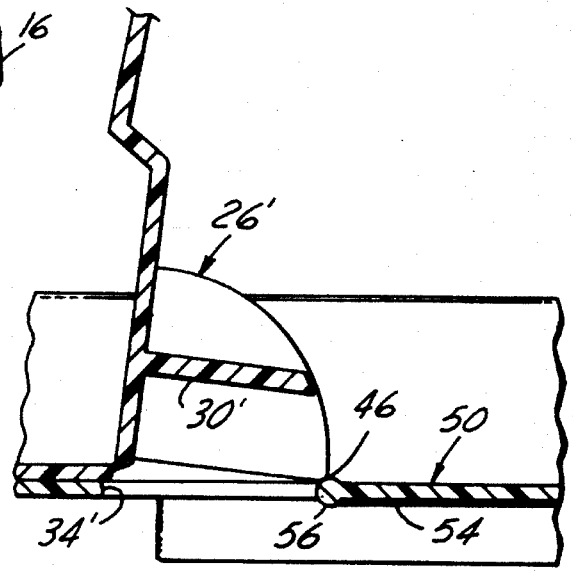
FIG.8
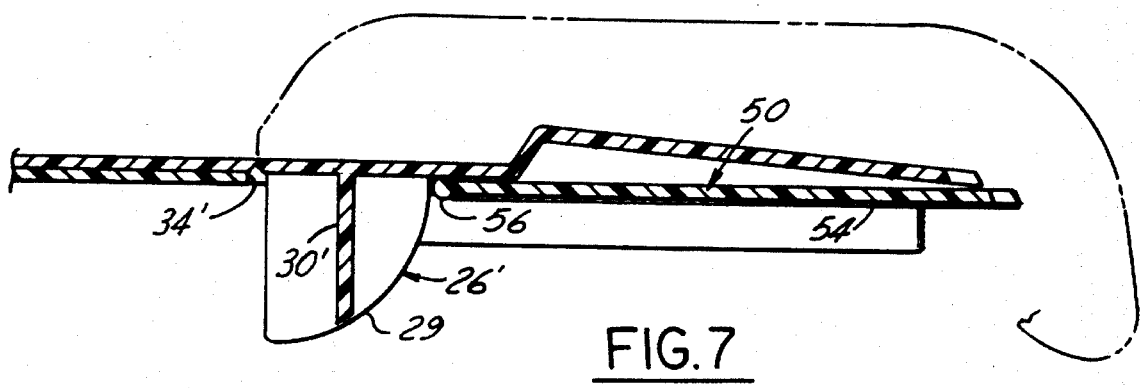
FIG.7

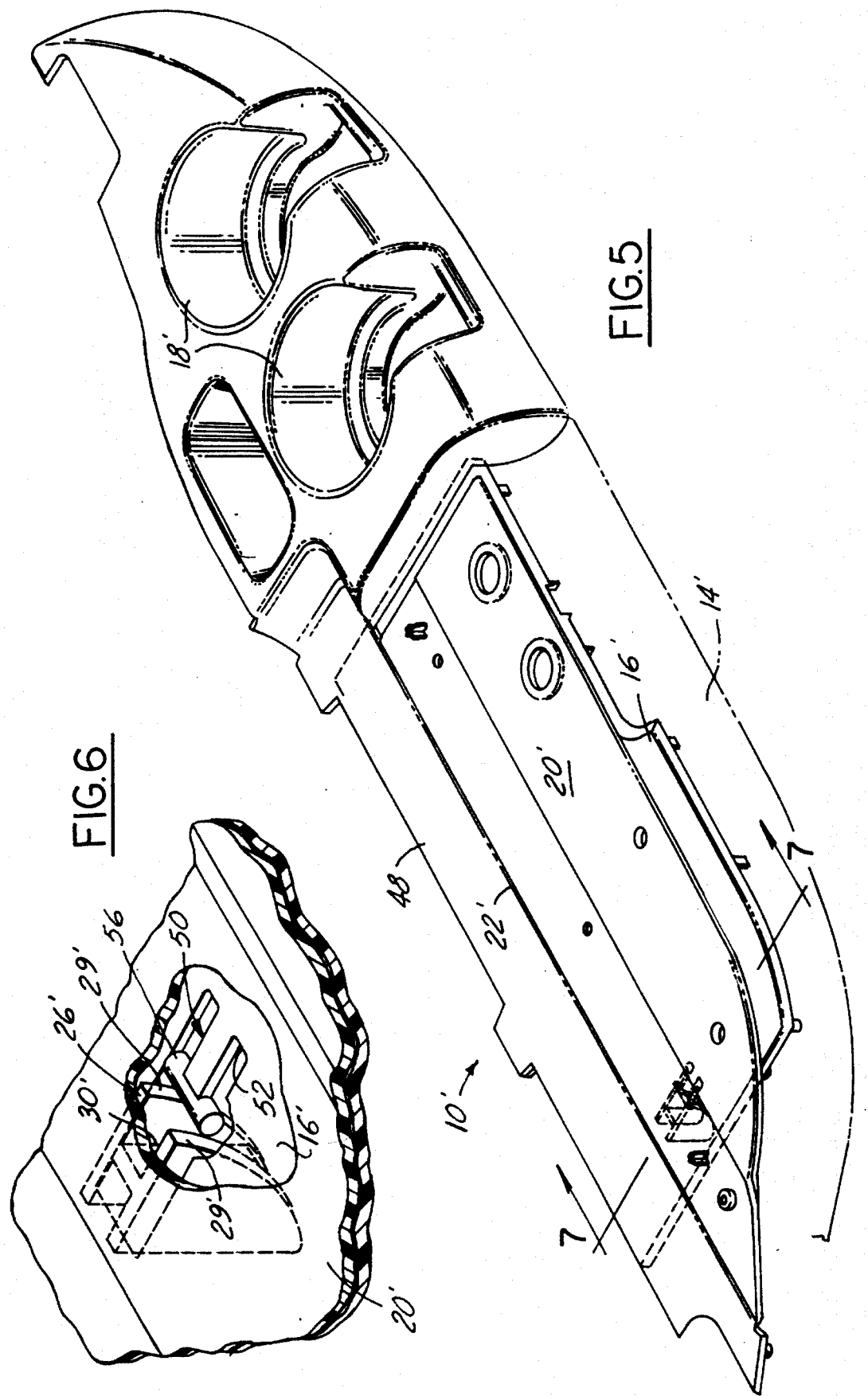

VEHICLE STORAGE COMPARTMENT WITH HOLD-OPEN DEVICE

TECHNICAL FIELD

This invention relates generally to vehicle storage compartments and, more particularly, to a hold-open device for the door of the storage compartment.

BACKGROUND ART

Heretofore, many vehicles, such as minivans and other recreational vehicles, have included side storage compartments having doors or lids hingedly mounted thereon, without any known means for holding a door or lid open.

Vanity assemblies, such as a vanity mirror, are known to be mounted on sun visors. These include, for example, a flange on a cover cooperable with two camming surfaces of a mounting bracket to provide snap-open and snap-closed positions, as disclosed in Kempkers U.S. Pat. No. 4,997,228; and dual detented positions for a cover involving two separate cam and leaf spring arrangements, with dwell positions on the respective cams, such as disclosed in Charen U.S. Pat. No. 4,993,772.

Hold-open arrangements are known for holding vehicle doors open in one or more opening positions. For example, Pelchat et al U.S. Pat. No. 4,266,321 discloses a hinge and hold-open assembly including a J-shaped spring portion adapted to be flexed by an edge surface of a door hinge strap leg, wherein the edge surface is formed with three lobe portions for three different door holding positions.

DISCLOSURE OF THE INVENTION

A general object of the invention is to provide an improved storage compartment for vehicles.

Another object of the invention is to provide an improved storage compartment, and a door having molded components, including a storage compartment door hold-open device.

A further object of the invention is to provide a storage compartment having a door flexibly hingedly mounted thereon, with a hold-open device integrally molded on the door and in the storage compartment, the hold-open device including a cam molded on the door, and a flexible interference finger molded on an upper shelf of the storage compartment.

These and other objects and advantages will become more apparent when reference is made to the following drawings and the accompanying description.

BRIEF DESCRIPTION OF THE DRAWINGS

FIG. 2 is an enlarged fragmentary perspective view of a hold-open device portion of the FIG. 1 structure;

FIG. 3 is an enlarged cross-sectional view taken along the plane of the line 3—3 of FIG. 1, and looking in the direction of the arrows;

FIG. 4 is a fragmentary view similar to FIG. 3, illustrating an operational mode of the invention;

FIG. 5 is a fragmentary perspective view of a vehicle storage compartment including an alternate embodiment of the invention;

FIG. 6 is an enlarged fragmentary perspective view of the hold-open portion of the FIG. 5 structure;

FIG. 7 is an enlarged cross-sectional view, taken along the plane of the line 7—7 of FIG. 5, and looking in the direction of the arrows; and FIG. 8 is a fragmentary view similar to FIG. 7, illustrating an operational mode of the alternate embodiment.

BEST MODE OF CARRYING OUT THE INVENTION

Figure 1:
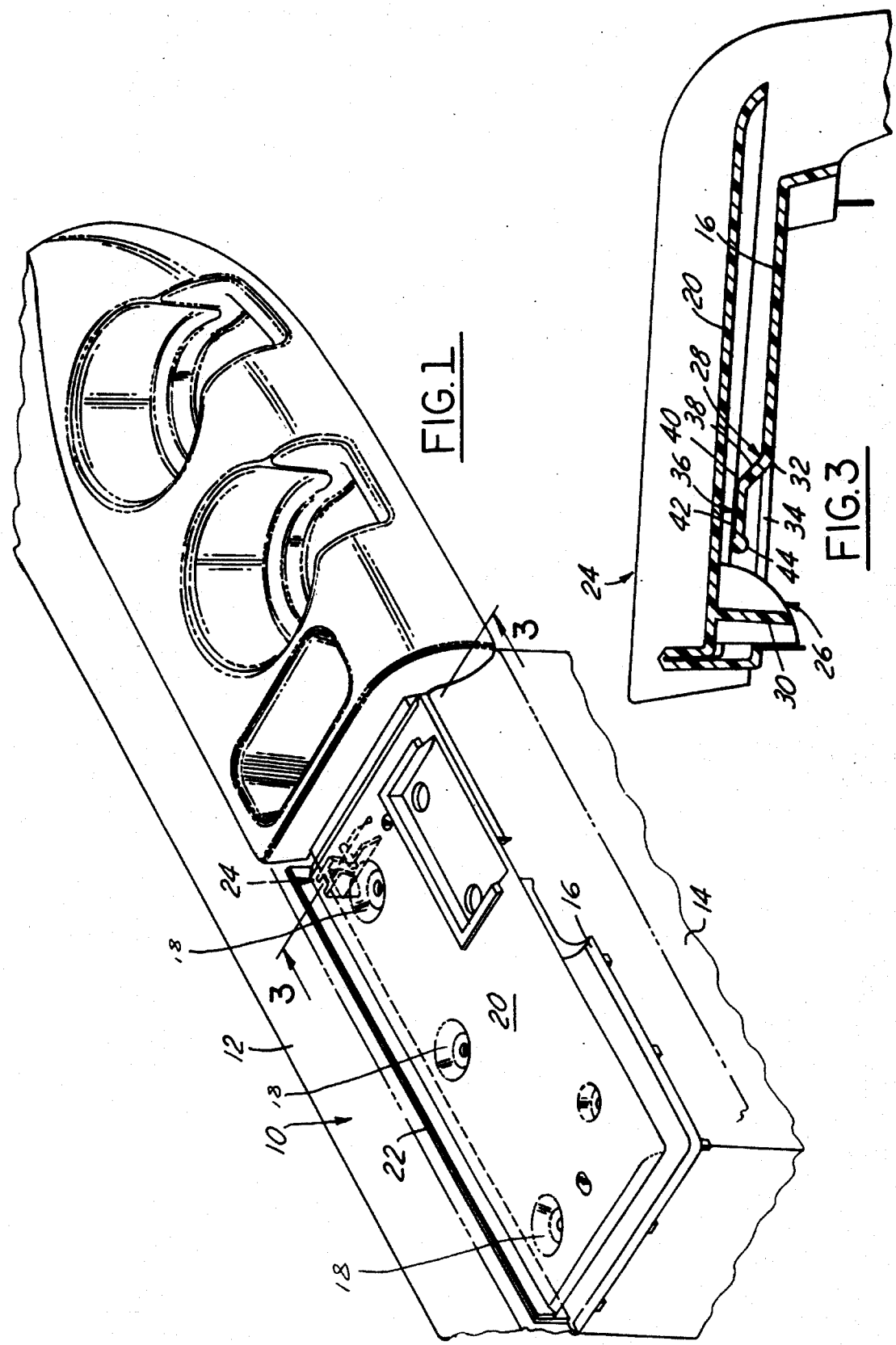
FIG. 1 is a fragmentary perspective view of a vehicle storage compartment embodying the invention.

Referring now to the drawings in greater detail, FIG. 1 illustrates a storage compartment 10, such as is typically positioned along the inside wall 12 adjacent the rear seats of a vehicle, such as a minivan, for the convenience of passengers. The compartment 10 includes a storage space, represented as 14, formed with an upper shelf 16, which may additionally include one or more circular recesses 18 suitable for holding cups (not shown). A door or lid 20, which includes a flexible hinge 22 along a rear edge thereof, is adapted to seat on the shelf 16 when closed. A suitable latch assembly, such as that shown in patent application, Ser. No.08/169,247 is secured in a suitable manner to a front inside edge portion of the door 20.

A hold-open device 24 serves to retain the door 20 in an open position any time the door is opened (FIG. 4). The hold-open device 24 includes a cam 26 integrally molded on the inner surface of the door 20, and a flexible finger 28 integrally molded on the shelf 16.

More specifically, the cam 26 is formed adjacent an inner corner of the door 20 to include a spaced pair of substantially one quarter circle discs 29 (FIG. 2) separated by a spacer 30.

The flexible finger 28 is formed on the shelf 16 adjacent the main opening into the storage compartment 10 and on an edge 32 of an adjacent small rectangular opening 34 (FIGS. 2–4). The finger 28 includes a strip 36 having a segment 38 extending from the edge 32 at a predetermined angle over a portion of the opening 34, with a bend 40 at a midpoint therein connecting the segment 38 to a segment 42 parallel to the shelf 16, and a solid round member 44 formed on the terminal end of the segment 42.

The round end member 44 and the opening beyond the member 44 are positioned so as to be directly beneath the cam 26, such that, when the door 20 is open, the distal ends 46 of the cam discs 29 rest on the member 44.

In operation, when it is desired to close the door 20, the latter is manually pressed downwardly causing the cam 26 to flex the strip 36 downwardly, snapping the cam 26 past the member 44, into the opening 34. When the door 20 is lifted, pivoting about the flexible hinge 22, the end portions of the cam discs 29 engage the round end member 44, lifting the latter while the discs 29 slide past the member 44 until the ends 46 snap upwardly past the member 44. This action then allows the strip 36 to return to its free state, with the ends 46 once again resting thereon to hold the door 20 open.

In the alternate arrangement of FIGS. 5–8, elements 10', 12', 14', 16', 18', 20', 22', 26', 29', 30', 34' and 46' are similar to the comparable elements of the FIGS. 1–4 arrangement, except that the discs 29' and the opening 34' are located at the opposite end of the door 20' and the shelf 16', as compared to the door 20 and the shelf 16. A flat ledge 48 (FIG. 5) replaces the inside wall 12 of the FIG. 1 set-up.

In lieu of the strip 36 of FIGS. 1–4, an integrally molded rectangular or oval cross-section finger 50 extends from an edge 52 (FIG. 6) of the opening 34'. A reinforcing ridge 54

(FIG. 7) may be included along the length of the bottom surface of the finger 50 and onto the bottom surface of the shelf 16'. A solid round member 56 is formed across the distal end of the finger 50.

The operation of the FIGS. 5–8 embodiment is like that of the FIGS. 1–4 arrangement, in that the ends 46' rest on the member 56 when the door 20' is open, and flex the finger 50 downwardly while the door is being closed.

INDUSTRIAL APPLICABILITY

It should be apparent that the invention provides an improved vehicle storage compartment wherein novel means are provided for holding open the compartment door.

It should be further apparent that the invention provides a compact, integrally molded, and inexpensive means for holding storage compartment doors or lids open when used in vehicles such as minivans and other recreational vehicles, to thereby replace a number of add-on parts, and reduce both piece and assembly costs.

While but two embodiments of the invention have been shown and described, other improvements are possible within the scope of the following claims.

What is claimed is:

1. On a storage compartment having an upper surface with a door hingedly mounted thereon, for use on an inner wall of a vehicle, a hold-open device comprising a cam on an inner surface of said door, and a flexible finger on said upper surface and positioned beneath said cam when said door is open so as to provide an interference for said cam to hold said door open until the door is manually pressed downwardly causing said cam to deflect said flexible finger downwardly and move therepast, as the door is closed onto said surface.

2. The hold-open device described in claim 1, wherein said cam is integrally molded on said door, and said flexible finger is integrally molded on said shelf.

3. The hold-open device described in claim 1, and an opening formed in said upper surface adjacent said storage compartment and adapted to receive said cam, with said flexible finger extending across a portion of said opening.

4. The hold-open device described in claim 1, wherein said cam is formed as substantially one-fourth of a round disc, with a portion of the arc thereof adapted to engage said flexible finger.

5. The hold-open device described in claim 3, wherein said flexible finger is formed to include an upwardly sloping strip segment extending from an edge of said opening, a bend between the sloping portion and a forwardly extending level strip segment, and a solid round member on the terminal end of the level strip segment adapted to interfere with said cam to hold the door open.

6. The hold-open device described in claim 3, wherein said flexible finger is formed to include an extension extending laterally from an edge of said opening, a solid round member formed across the terminal end of the extension, and a reinforcing ridge extending along the length of the extension and onto adjacent portion of the storage compartment.

7. The hold-open device described in claim 6, wherein said extension is formed to have an oval cross-sectional shape.

8. On a storage compartment having an upper surface with a door hingedly mounted thereon, for use on an inner wall of a vehicle, a hold-open device comprising a cam on an inner surface of said door, a flexible finger on said upper surface and positioned beneath said cam when said door is open so as to provide an interference for said cam to hold said door open until the door is manually pressed downwardly causing said cam to deflect said flexible finger downwardly and move therepast, as the door is closed onto said surface, and an opening formed in said upper surface adjacent said storage compartment and adapted to receive said cam, said flexible finger extending across a portion of said opening wherein said flexible finger is formed to include an upwardly sloping strip segment extending from an edge of said opening, a bend between the sloping portion and a forwardly extending level strip segment, and a solid round member on the terminal end of the level strip segment adapted to interfere with said cam to hold the door open.

* * * * *